Dec. 8, 1942.  E. E. HANS  2,304,643
AUTOMOBILE VENTILATING DEVICE
Filed March 12, 1940  4 Sheets-Sheet 1

INVENTOR
Edmund E. Hans
BY Colvin C. McRae
ATTORNEY

Dec. 8, 1942.  E. E. HANS  2,304,643
AUTOMOBILE VENTILATING DEVICE
Filed March 12, 1940   4 Sheets-Sheet 2

INVENTOR
Edmund E. Hans
BY
Edwin C. McRae
ATTORNEY

Dec. 8, 1942.　　　E. E. HANS　　　2,304,643
AUTOMOBILE VENTILATING DEVICE
Filed March 12, 1940　　　4 Sheets-Sheet 3

INVENTOR
Edmund E. Hans
BY
Colvin C. McRae
ATTORNEY

Dec. 8, 1942.  E. E. HANS  2,304,643
AUTOMOBILE VENTILATING DEVICE
Filed March 12, 1940  4 Sheets-Sheet 4

INVENTOR
Edmund E. Hans
BY
Edwin C. McRae
ATTORNEY

Patented Dec. 8, 1942

2,304,643

UNITED STATES PATENT OFFICE 2,304,643

AUTOMOBILE VENTILATING DEVICE

Edmund E. Hans, Detroit, Mich.

Application March 12, 1940, Serial No. 323,589

10 Claims. (Cl. 98—2)

The object of my invention is to provide an improved ventilating device for air-conditioning an automobile. The term "air conditioning," as used herein, means keeping the air in the car at a uniform temperature, purifying the air, and maintaining same at the correct degree of humidity so as to prevent the formation of steam on the windows of the car. By "uniform temperature" is meant maintaining the relatively high temperature around the passengers' feet while maintaining cooler air for breathing. It is believed that in order to effectively air condition an automobile one must have two separate supplies of air-heated air to warm the passenger and the fresh, natural outside air, which alone can add purity, cleanliness and freshness to the warmed air. Air which has been heated appreciably is already irretrievably spoiled for breathing. It does not make any difference whether it is outside fresh air that is heated or inside re-circulated air. The damage is done in the heating.

In the out-moded method of car heating, the same air in the car is circulated and re-circulated. This air becomes stale and causes the windows to frost and the driver and passengers to grow drowsy. The object of this invention is to provide means for introducing outside fresh air into the car at breathing level for the driver and passengers. At the same time, another supply of air is heated and re-circulated. This second supply travels through the heater describing a low circle from front to rear and back to the front. This circle of warmed air flows around the bodies of the passengers. It moves at a high velocity to give a uniform temperature to the car. Air at low velocity only heats the front compartment, for without sufficient velocity the air merely forms a short circle and re-cycles the heated air. Furthermore, air traveling at low velocity through the radiator cannot absorb as many Btu. as air at high velocity. The greater the quantity of air passing through a radiator core the greater the quantity of heat it will pick up.

Motorists try to freshen the air in their cars by opening the windows, but this causes drafts so usually the windows are left closed and the passengers suffer. In my improved system fresh air is introduced in proper amount and without causing drafts.

A further object of my invention is to provide an air conditioning unit which may be operated in rainy weather as well as in dry weather. My improved unit effectively separates rain from the incoming air even at the highest speeds at which the vehicle is normally driven.

A further object of my invention is to provide a heating and ventilating system wherein the driver of the car may easily control the temperature thereof. The operator, by controlling the supply of fresh air into the car, may regulate both the temperature and freshness of the air within the car according to the will of the passengers.

With these and other objects in view, my invention consists in the arrangement, construction and combination of the various parts of my improved ventilating system, as described in this specification, claimed in my claims, and illustrated in the accompanying drawings, in which:

Figure 1:
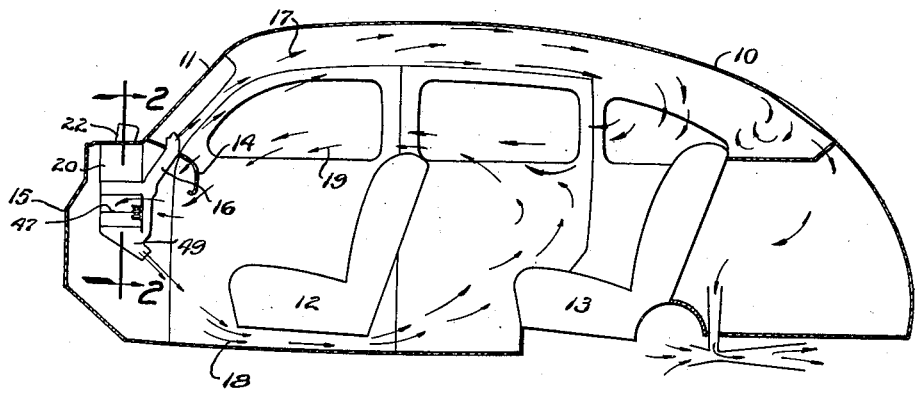
Figure 1 is a diagrammatic, vertical central sectional view through a motor vehicle body having my improved heating and ventilating unit installed therein and showing the paths taken by the hot and cold air in being circulated therethrough.
Figure 5:
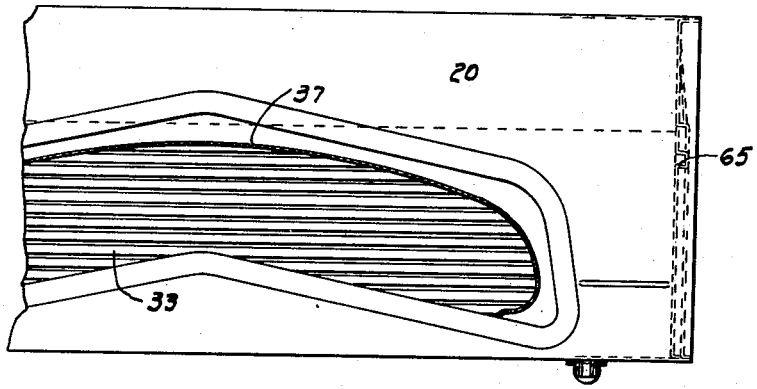
Figure 5 is a sectional view, taken upon the line 5—5 of Fig. 4.

Referring to Figure 1 of the drawings, I have used the reference numeral 10 to identify a closed type motor vehicle body; said body having a conventional windshield 11 and front and rear seats 12 and 13, respectively, positioned therein. The front seat 12 is spaced a short distance above the floor of the body 10 so that air may pass underneath the seat to the rear compartment. If desired, the seat may be constructed so that the air will pass through the seat in order that it may then rest upon the floor.

An instrument board 14 extends across the body just beneath the windshield, which instrument board is spaced rearwardly from a dash 15. My improved ventilating unit is adapted to be fixed in position beneath the cowl portion 21 of the body and positioned longitudinally between the dash 15 and the instrument panel 14.

Before describing the structural features of my improved ventilating unit, it is well to briefly outline the circulatory system produced by my unit and which is believed to be unique in this field. Referring to Fig. 1, air is drawn through a suitable opening in the cowl of the vehicle and is propelled by a cold air fan upwardly through a cold air conduit through the instrument panel where it is discharged upwardly and rearwardly substantially parallel to the windshield of the vehicle.

A stream of cold air thus flows rearwardly along the under side of the roof of the car, as shown by arrows 17.

While this is taking place, a heating fan recirculates air through a heating radiator core, from which it is discharged downwardly and rearwardly along the floor of the car, as shown by arrows 18. The heated air 18 rises in the space between the front and rear seats 12 and 13, while the cold air is deflected downwardly by the rear portion of the body and mixes with the rising hot air stream. The mixture, better described as warm air, returns forwardly at a point just above the seat backs, as shown by arrows 19. This warm air stream 19 enters through suitable openings in the unit just above the heating fan where it is re-circulated through the radiator core and the heated air again directed downwardly and rearwardly beneath the front seat of the car.

The advantages of this circulatory system are that invigorating, fresh air is supplied to the occupants of the car at breathing level while the occupants' feet and bodies are amply warmed, and that sufficient outside air is added to the atmosphere within to lower its humidity and thus prevent the formation of steam on the vehicle windows, even in extremely cold weather.

The normal respiration of three or more people in a closed car invariably increases the humidity of the air to an extent where the formation of steam on the windows is unavoidable. To overcome this, other heaters have been provided with cold air inlets, but if sufficient cold air enters through these inlets to appreciably lower the humidity through dilution then the occupants' feet and lower portions of their bodies are chilled. This system is believed to be unique in that outside air of low humidity is circulated around the windows and at breathing level while re-circulated warm air is supplied along the floor of the car.

Figure 2:
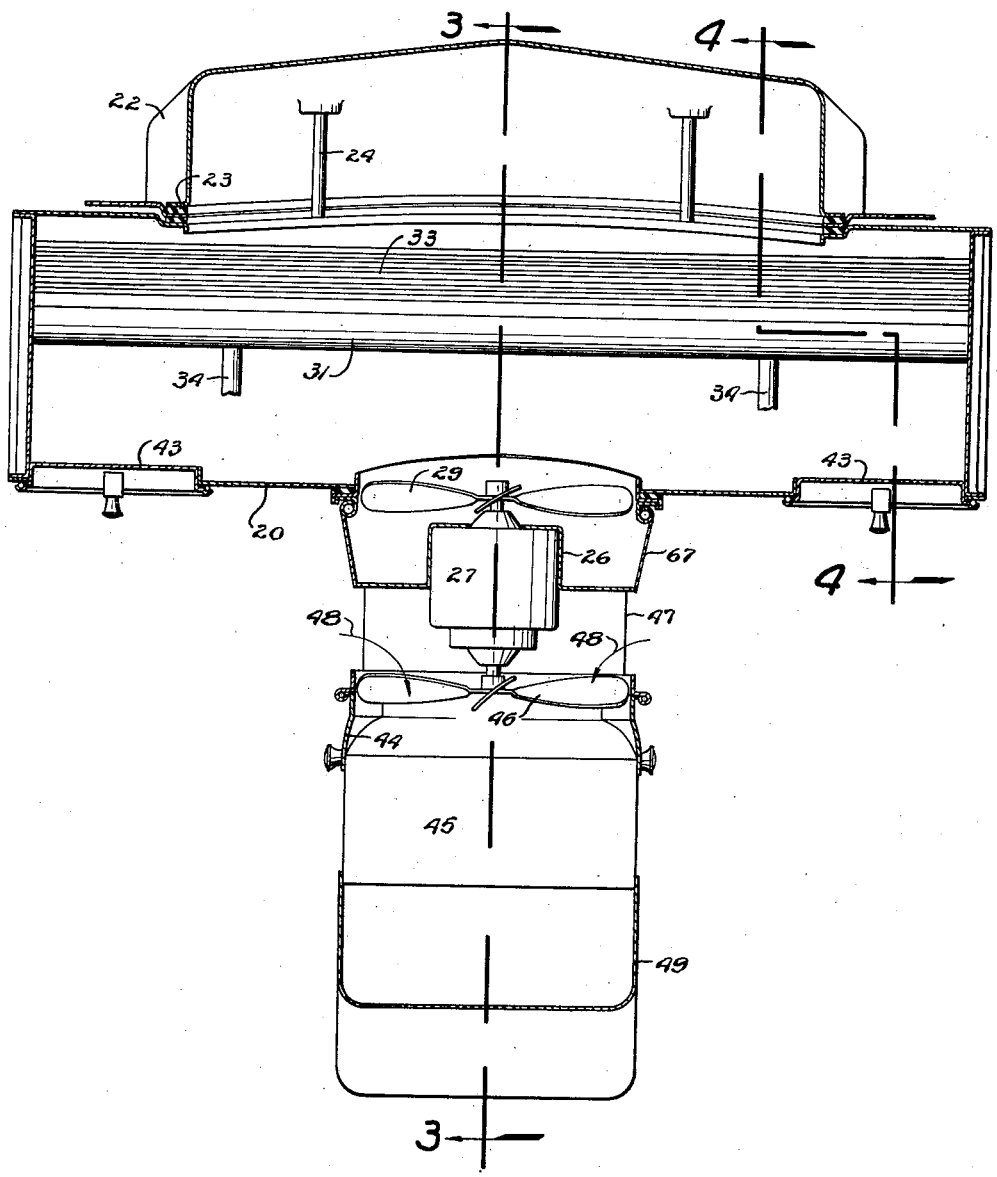
Figure 2 is a sectional view, taken upon the line 2—2 of Fig. 1.
Figure 3:
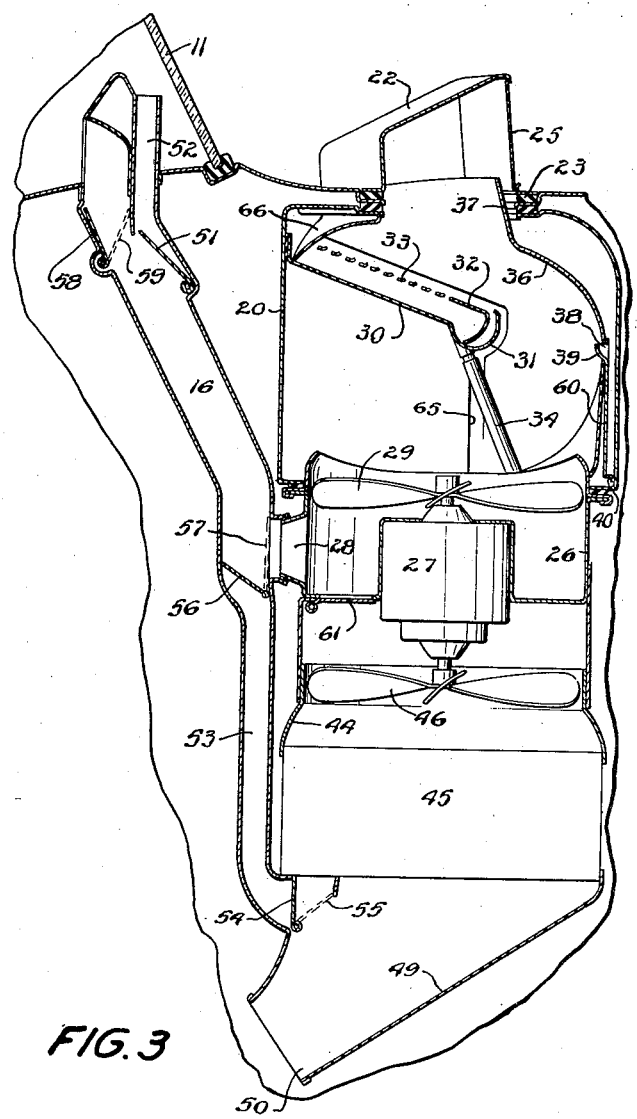
Figure 3 is a sectional view, taken upon the line 3—3 of Fig. 2.

The structure for accomplishing this result is more specifically shown in Figs. 2 and 3 of the drawings, from which it will be noted that my ventilating unit comprises a rectangular shaped sheet metal chamber 20, which is secured in a horizontal position beneath the cowl of the vehicle between the dash and the instrument board. The upper face of the chamber 20 and adjacent portion of the vehicle cowl 21 are provided with rectangular shaped aligned openings therein, and a scoop member 22 is bolted to the upper side of the cowl, so that when the car is in forward motion, air will be scooped in by the member 22 and directed down through the cowl opening, into the chamber 20. Soft rubber gaskets 23 are interposed between the scoop member 22 and the cowl 21, and between the cowl 21 and the chamber 20. Tie bolts 24 clamp the scoop and chamber against the respective sides of the cowl, so as to hold the unit in place. It will also be noted that the front face scoop member 22 is provided with a screen 25, as is customary in cowl ventilator construction.

A circular opening is provided in the bottom portion of the chamber 20 over which a cylindrical fan housing 26 is secured. An electric motor 27 is fixed in the center portion of the housing 26, and a rectangular shaped discharge flange 28 is formed in the rear side of the housing 26. A propeller type fan 29 is mounted upon the upper end of the motor armature shaft within the fan housing 26 and substantially fills the circular opening at the bottom of the chamber 20.

From the foregoing it will be seen that when the fan 29 is in operation, air will be forced by the scoop 22 into the chamber 20, from which it is drawn by the fan 29, and directed rearwardly through the flange 28. A rectangular shaped conduit 16 co-acts with the flange 28 and conducts the air from the housing 26 upwardly through an opening in the instrument board where it is discharged rearwardly along the roof of the car.

Before describing the other parts of my construction, it may be well to described the rain separating device employed within the chamber 20 to separate out all water which may be carried by the air entering scoop 22. This rain separator, per se, is not claimed herein but is described to form a basis for a divisional application.

A baffle plate 30 extends across the rear portion of chamber 20 the full length thereof, the rear edge of the plate 30 being secured to the rear wall of the chamber 20, with the forward portion extending diagonally downwardly where it terminates in a trough 31 positioned forwardly of the center of the chamber. A louvered plate 32 extends substantially parallel to plate 30, but is spaced a short distance above same and is provided with 33 louvers 33 extending the full length of the chamber. The lower and forward end of the plate 32 is bent downwardly and rearwardly so that it rests in the bottom of the trough 31. A drain pipe 34 extends from the trough 31 downwardly toward the front bottom portion of the chamber 20. It will be noted in Figure 4 that an opening 35 is provided in the downwardly turned edge of the plate 32, so that water which may have collected in the space between the plates 30 and 32 may drain directly into a conduit 34. The trough 31 is also connected to drain into the conduit 34.

Figure 4:
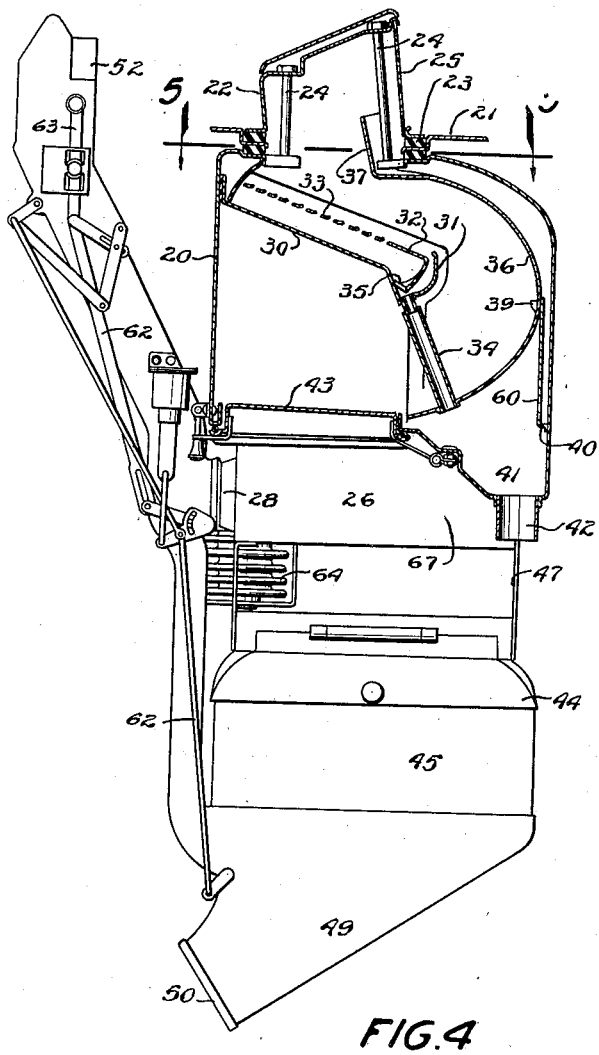
Figure 4 is a sectional view, taken upon the line 4—4 of Fig. 2.

It will also be noted from Figure 4 that a cylindrical deflecting plate 36 extends the length of the chamber 20, its upper edge portion 37 projecting upwardly so that it obstructs the lower portion of the scoop opening. The plate 36, from the bottom of the portion 37, curves forwardly and downwardly so as to direct the air in a smooth circular path around the trough 31. The point of greatest restriction to the flow of air is at the lower end of the plate 32. This forms the throat of a venturi. Tests have shown that more air will pass through this separator at a given car speed when the throat is relatively narrow than when this apparent restriction is widened. This is an important feature, as it insures adequate ventilation of the car in the summer, even when it is raining outside.

Referring again to Figure 3, a longitudinally extending slot 38 is provided in the curved wall of the plate 36, in vertical alignment with the trough 31, through which a lip 39 on a plate 60 extends. The plate 60 is fastened to the forward wall of the chamber 20 and is provided with an opening 40 in its bottom portion, so that drops which collect on the upper portion of the plate 36 will be blown down against the lip 39, through the slot 38 and then descend between the forward wall of the chamber 20 and the plate 60 and drain through the opening 40 into the bottom of the chamber.

Each end of the chamber 20 is provided with a vertical groove 65 into which the water which flows down the ends of the chamber is directed. This prevents the high velocity air from carrying over any water into the lower compartment of the separator. A curved shield 66 extends from the bottom rear edge of the scoop 22 rearwardly and downwardly to the pan 30 to guide the water off the scoop into the pan 30.

It will also be noted that a large portion of the incoming water will be stopped by the plate 37, which water will drain downwardly between the plate 36 and the forward wall of the chamber 20 and discharge into the sump 41 through the opening 40. It is important that the water collected by this initial separation be isolated from the air stream. The space between the plate 36 and forward wall of the chamber 20 accomplishes this function.

Sumps 41 are formed in the forward bottom portion of the chamber 20, into which both the opening 40 and the pipe 34 discharge. These sumps are provided one on each side of the fan housing 26. It will also be noted that the bottom end of the plate 36 is spaced from the rearward edges of the sumps 41 so that water which may collect on the plate 36 beyond the slot 38 will drop off the lower edge of the plate 36 into these sumps.

Nipples 42 are secured in the bottom of each sump 41 to which hoses, not shown on the drawings, may be connected so that the water collected will drain out through the bottom of the car.

From the foregoing it will be noted that air is forced into the scoop 22, both by the forward motion of the car and by the action of the fan 29, the air first striking the upper edge of the plate 37 where the heavier drops of water therein will collect on the forward face of the plate and flow down into the sumps 41 in the space between the plate 36 and forward wall container 20. The air then is deflected downwardly and strikes the louver plate 33 where more of its water content is discharged through conduit 34. The water so collected also drains into the sumps 41. The air is then deflected forwardly against the plate 36, and, due to centrifugal force, the remainder of the water content is thrown against the plate 36, a portion of which is discharged through the slot 38, and the rest of which continues downward to the bottom edge of the plate where it is discharged directly into the sumps 41. Relatively dry air is then free to enter the fan housing 26.

The fan 29 is used primarily for ventilating the car in the winter time when a large amount of air is not required. More air is required for ventilation in the summer, and in order to obtain the maximum circulation of air through the chamber 20 I have provided two doors 43 in the bottom of the chamber, disposed one on each side of the fan 29, which doors are hinged at their forward edge so as to swing downwardly and thus allow the air which enters the chamber to discharge directly into the passenger compartment of the car. Thus, for summer driving an ample flow of air through the separator is assured.

The operation of a ventilating system for conditioning the car in the winter time will now be described:

Referring to Figure 2, it will be noted that a heating unit housing 44 is secured to the bottom of the cold air fan housing 26, in which a radiator core 45 is mounted in a horizontal position. The armature shaft of the motor 27 extends downwardly through the lower end plate of the motor, and a heat circulating fan 46 is mounted thereon in position spaced from the bottom of the fan housing 26. A rectangular shaped opening 47 is provided in each side of the heater housing in vertical position between the upper face of the fan 46 and the under side of the housing 26. Air from within the car may thus be supplied to the fan 46, as shown by arrows 48. The air entering through the openings 47 is forced downwardly by the fan 46 through the core 45 into a collector 49 whence it is directed rearwardly and downwardly by a rectangular shaped nozzle 50.

The operation of the fan 46 and the radiator core 45 is similar to that of conventional heaters, in that air from within the car is re-circulated through the radiator. No outside air is ordinarily supplied to the fan 46 but under certain conditions, as will later be brought out, about 100 cu. ft. of outside air per minute may be supplied directly to the radiator through a manually operated valve 61 in the bottom of the housing 26.

I have shown a bellows type thermostat 64 positioned in one of the openings 47, the purpose of which is to control the flow of water entering the radiator core 45. When the car temperature is below normal a flow of hot water is supplied to the radiator, but when the re-circulated air reaches normal temperature the thermostat controls the water supply so that the car is not overheated.

A thermostat may also be used to operate the control 63 but, like thermostat 64, is not considered essential for the satisfactory operation of this unit. A fan shaped defroster nozzle 52 is formed integrally with the conduit 16 just above the instrument panel, and directs air from the conduit upwardly against the windshield. Only a small portion of the air being discharged through the conduit 16 normally enters the defroster nozzle 52. However, this amount is ample to keep steam from forming upon the windshield.

During normal operation of the unit in the winter time, cold air is forced by the scoop 22 into the chamber 20 and is blown into the conduit 16 by the fan 29. The major portion of the air discharged from the conduit is directed upwardly and rearwardly along the roof of the car, with a small portion discharged by the defroster nozzle 52 against the windshield. While this is taking place, air from within the car is drawn in by the heating fan 46 and is blown through the radiator, the heated air being discharged by the nozzle 50 rearwardly along the floor of the car.

These two streams of air travel along the roof and floor of the car, respectively, to the rear thereof, where the hot air stream rises and mixes with the cold air stream, and the mixture flows forwardly along a path just above the front seat of the car. This mixture of air enters the heating fan housing through the openings 47 and is re-circulated through the radiator 45. Sufficient air leaks out from the windows and doors to compensate for the fresh cold air which is discharged rearwardly along the roof of the car.

The main feature of this construction is that it maintains fresh clean air in the car at the breathing level and still maintains sufficient warmth upon the occupants' feet to assure comfort.

It sometimes happens that after the car has been standing still ice will have formed upon the windshield, and in such cases it is desirable that heated air be blown against the windshield to quickly melt the ice before the car can safely be driven. In order to accomplish this, I have extended the conduit 16 downwardly to the collector 49, this portion of the conduit being given the reference numeral 53. A vane type valve 54 is mounted between the conduit 53 and the collector member 49 which, in the normal operating position, closes this conduit from the collector. However, the valve may be moved to the position as shown by dotted lines 55, so that a portion of the air blown through the radiator will be deflected into the conduit 53. A second vane type valve 56 is interposed between the conduits 53 and 16, and in the normal operating position obstructs the flow of air between these two conduits. However, this valve may also be moved to the position as shown by dotted lines 57, in which position the conduit 16 is closed from the fan housing 26 and open to the conduit 53. Still another vane type valve 58 is mounted in the upper end of the conduit 16, just above the intersection of the defroster nozzle 52, which valve normally permits free flow of air through the upper portion of the conduit 16, but may be moved to the position as shown by dotted lines 59, so that all of the air flowing through the conduit 16 may be discharged through the defroster nozzle 52. A valve 51 is provided in the defroster nozzle 52 which normally is held about half closed to thereby restrict the amount of air being blown against the windshield, but which may also be opened to allow all of the air in the conduit 51 to be blown through the nozzle 52. Nozzle 50 builds up the static pressure in the core 45.

The valves 54, 56, 58 and 51 are connected by suitable linkage 62 to a manual operating device 63 so that at one position of the operating device all of the valves will be moved to the positions shown by solid lines, while in the other position of the operating device the valves will be moved to positions shown by dotted lines. The normal operation of the device under the first mentioned position of the valves has previously been described. When these valves are moved to their other positions the discharge from the fan housing 26 is almost closed off so that very little cold air will be drawn into the car. At this time the air within the car will be circulated through the radiator core 45, and a portion thereof will be deflected by the valve 55 upwardly through the conduits 53 and 16, and will mix with the reduced output from the fan 29. This mixture will then be discharged through the defroster nozzle 52 against the windshield. Ice upon the windshield will be thus readily removed. The control device 63 may then be moved to its normal operating position where the device will function as has previously been described.

Referring now to the function of the valve 61, this valve is only opened under exceptional conditions. These conditions arise when ice tends to form upon the windshield and the operator desires to drive the car with several occupants therein. When the defroster is normally operated the valve 56 is almost closed so that only a small amount of outside air enters the car. This amount will not dilute the air within the car sufficiently to maintain a low degree of humidity with several occupants in the car. Consequently, the windows are apt to steam. In order to prevent this the valve 61 is opened, thereby allowing about 100 cu. ft. of air per minute to enter the car from outside. This outside air is heated by the radiator and a portion thereof blown against the windshield. The remainder is directed along the flow of the car and dilutes the atmosphere so that steam will not form on the windows.

This procedure is not recommended except under the above mentioned circumstances, as the car takes longer to warm up to room temperature, because the temperature at the floor is only a few degrees warmer than at breathing level. In any event, when the ice has melted from the windshield the valve 61 may be closed and the control 63 moved to normal position where steam will not form on the windows.

Another function of the valve 61 is that in sub-zero weather air entering overhead through conduit 16 may cool down the rear compartment too much. By adjusting the valve 56 with the control 63 a comfortable room temperature may be maintained. However, there may not be sufficient outside air flowing into the car to keep the windows from steaming, but, by opening the valve 61, the necessary outside air may be brought into the car through the radiator core. For summer cooling I have provided a pair of doors 67 on each side of the chamber 26, which may be opened to let the air from the fan 29 be blown directly into the car. The doors 67 and 43 are normally closed in the winter, but when a large quantity of outside air is desired they may be opened. From 250 to 300 cu. ft. per min. of air may pass through these doors with the car standing still. This is sufficient to displace the air in both front and rear compartments in less than one minute.

Even though the doors 67 are opened outside air is picked up by fan 46 through the openings 47 and is forced out of the nozzle 50 at high velocity to the rear of the car.

A further advantage of my improved device is that clean fresh outside air is provided to the occupants of the car at breathring level, while at the same time air from within the car is reheated and re-circulated around the passengers' feet. This is most essential in order to lessen the driver's fatigue and to still insure sufficient heat for passenger comfort.

Still a further advantage of the above described unit is that steam is prevented from forming upon the windows of the car, even though the temperature therein is maintained at a comfortable level.

Still a further advantage of this unit is that it will function in rainy weather as efficiently as in dry weather when other ventilating systems must be shut off. My improved rain separator is unique in that it offers very little obstruction to the flow of air therethrough, so as to provide ample air operation in the summer time. For summer driving the ventilator may be opened so that practically no restriction is offered to the incoming air.

Some changes may be made in the arrangement, construction, and combination of the various parts in my improved system, without departing from the spirit of my invention, and it is my intention to cover by my claims such changes as may be reasonably included within the scope thereof.

I claim as my invention:

1. An automobile heating and ventilating device comprising, means for conducting outside air into the forward portion of said vehicle and forcing same rearwardly along the under side of the vehicle roof to the rear of the vehicle, a heating radiator in the forward portion of said vehicle intermediate the top and bottom thereof, means for forcing air from within said vehicle through said radiator and directing said heated air rearwardly along the floor of said vehicle to the rear thereof, said stream of heated air mixing with said stream of outside air in the rear portion of said vehicle and said mixture returning forwardly to said radiator along a path substantially half way between said floor and said roof.

2. An automobile heating and ventilating device comprising, a chamber disposed beneath the cowl of said vehicle, said chamber having an air passageway therein extending to the outside of said vehicle, a fan associated with said chamber, a housing for said fan, a conduit extending from said housing to position just rearwardly of the vehicle windshield, said fan functioning to draw air from outside through said chamber and blow same through said conduit upwardly and rearwardly along the under side of the vehicle roof, a heating radiator in the forward portion of said vehicle intermediate the top and bottom thereof, a fan associated with said heating radiator which draws air from within the vehicle body and blows same through said radiator, and means for directing the heated air from said radiator downwardly and rearwardly along the floor of said vehicle to the rear thereof, the stream of outside air mixing with the stream of heated air in the rear portion of the vehicle, and the air thus mixed returning forwardly to the fan associated with the radiator along a path substantially midway between the floor and the roof for reheating and recirculation.

3. An automobile heating and ventilating device comprising, a chamber disposed within said vehicle, an air passageway extending from said chamber to the outside of said vehicle, a ventilating fan housing in communication with said chamber, a fan disposed in said housing which operates to draw outside air through said chamber and blow same directly into said vehicle, a heating radiator, a recirculating fan associated with said radiator which normally draws air from within said vehicle body and blows same through said radiator, a passageway connecting said ventilating fan housing with said recirculating fan, and an operable valve in said last mentioned passageway which, when open, permits air from said ventilating fan housing to flow to said recirculating fan, for the purpose described.

4. A device, as claimed in claim 3, wherein a single motor is provided, which is connected to both said ventilating fan and said recirculating fan for simultaneously driving same.

5. An automobile heating and ventilating device comprising, a chamber disposed within said vehicle, an air passageway extending from said chamber to the outside of said vehicle, a ventilating fan housing in communication with said chamber, a fan disposed in said housing which operates to draw outside air through said chamber into said housing, a conduit extending from said housing to position just rearwardly of the vehicle windshield, said conduit conducting the air from said fan upwardly and rearwardly along the under side of the vehicle roof, a heating radiator, a recirculating fan associated with said radiator which normally blows air from within said vehicle through said radiator downwardly and rearwardly along the floor thereof, a passageway connecting said ventilating fan housing with said recirculating fan, means for conducting a portion of the air leaving said radiator to position adjacent to the vehicle windshield, and an operable valve disposed in said last mentioned passageway which, when open, permits air from said ventilating fan housing to flow to said heating radiator and thus lower the humidity of the atmosphere within the car.

6. An automobile heating and ventilating device comprising, a chamber disposed beneath the cowl of said vehicle, an air passageway extending from said chamber to the outside of said vehicle, a fan housing secured over an opening in said chamber, a ventilating fan in said housing which draws outside air into chamber and blows same upwardly and rearwardly along the roof of said vehicle, a heating radiator spaced beneath said chamber, a fan casing aligned with said radiator, a recirculating fan therein which circulates air from within the vehicle through said radiator and propels same downwardly and rearwardly along the floor of the vehicle, the ouside air and the heated air mixing in the rear portion of the vehicle and returning to the recirculating fan along a path substantially midway between the floor and roof, said chamber having an operable door in its lower portion which, when open, permits air from said chamber to directly enter said vehicle.

7. A closed vehicle heating and ventilating device comprising means for conducting unheated outside air into said vehicle through an opening in the cowl thereof, a heating radiator in the forward portion of said vehicle intermediate the top and bottom thereof, means for blowing said unheated air rearwardly and upwardly along the under side of the vehicle roof to the rear of the vehicle, a second means for blowing air from within the vehicle through said radiator and downwardly and rearwardly along the floor of said vehicle to the rear thereof, and a motor connected to both of said blowing means for simultaneously driving the same, the stream of unheated air and the stream of heated air mixing in the rear portion of the vehicle and the air thus mixed returning forwardly at an intermediate level in said vehicle to said second means for blowing air for reheating and recirculation along the floor.

8. That method of air-conditioning the interior of a closed vehicle which includes the steps of admitting air from outside into the front of the vehicle and discharging it upwardly and rearwardly therein from a point above an intermediate horizontal zone and simultaneously withdrawing air for recirculation from said intermediate zone, heating the withdrawn air, and discharging it rearwardly adjacent the floor level whereby the recirculated air and the upwardly and rearwardly discharged air flow together toward the rear of the vehicle and travel forwardly in the intermediate zone for reheating and recirculation.

9. An automobile heating and ventilating device comprising a rectangular-shaped chamber disposed beneath an opening in the cowl of said vehicle, a fan housing secured over an opening in the lower portion of said chamber, said fan housing having a ventilating fan mounted therein which draws outside air through said chamber and discharges same into said housing, a conduit extending from said housing upwardly to position spaced just rearwardly of the vehicle windshield, which directs the air discharged by said fan upwardly and rearwardly along the under side of the vehicle roof, a heating radiator fixed in position spaced beneath said fan housing, a recirculating fan disposed between said heating radiator and said fan housing, said recirculating fan drawing air from within the car and forcing same through said radiator, means for directing the air leaving said radiator downwardly and rearwardly along the floor of the vehicle, a motor fixed to said fan housing having one end of its armature shaft connected to said ventilating fan with the other end of said shaft connected to said recirculating fan, an auxiliary conduit extending from a position beneath said radiator to said first-mentioned conduit, with which it communicates, and an operable valve disposed within said auxiliary conduit, said valve in one position restricting the air discharged from said fan housing and permitting a portion of the heated air discharged from said radiator to flow upwardly through said conduits.

10. An automobile heating and ventilating device comprising, means for conducting outside air into the forward portion of said vehicle and forcing same rearwardly along the under side of the vehicle roof to the rear of the vehicle, a heating radiator in the forward portion of said vehicle intermediate the top and bottom thereof, means for forcing air from within said vehicle through said radiator and directing said heated air rearwardly along the floor of said vehicle to the rear thereof, said stream of heated air mixing with said stream of outside air in the rear portion of said vehicle, said mixture returning forwardly to said radiator along a path substantially half way between said floor and said roof, and means responsive to the temperature of air flowing past it and located in the path of said forwardly returning mixture adjacent said air forcing means, the heat responsive means controlling the flow of a heating medium to said radiator.

EDMUND E. HANS.